US011663159B2

United States Patent
Neaga et al.

(10) Patent No.: US 11,663,159 B2
(45) Date of Patent: May 30, 2023

(54) DETERMINISTIC ENFORCEMENT IN DATA VIRTUALIZATION SYSTEMS

(71) Applicant: International Business Machines Corporation, Armonk, NY (US)

(72) Inventors: Maxim Neaga, San Jose, CA (US); Roger C. Raphael, San Jose, CA (US); Shantanu Sadanand Mundkur, Fremont, CA (US); Hebert Walter Pereyra, North York (CA); Yaxian Wang, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 17/446,473

(22) Filed: Aug. 31, 2021

(65) Prior Publication Data

US 2023/0067938 A1     Mar. 2, 2023

(51) Int. Cl.
  *G06F 16/11*    (2019.01)
  *G06F 16/25*    (2019.01)
  *G06F 21/62*    (2013.01)

(52) U.S. Cl.
  CPC .......... *G06F 16/122* (2019.01); *G06F 16/256* (2019.01); *G06F 21/6227* (2013.01)

(58) Field of Classification Search
  CPC ... G06F 16/122; G06F 16/256; G06F 21/6227
  USPC ......................................................... 707/694
  See application file for complete search history.

(56) References Cited

U.S. PATENT DOCUMENTS

| 8,117,104 | B2 | 2/2012 | Kothari |
| 8,490,150 | B2 | 7/2013 | Hadar et al. |
| 8,650,165 | B2 * | 2/2014 | Thakur ................ G06F 16/122 |
| | | | 707/763 |
| 8,874,929 | B2 | 10/2014 | Fastring |
| 9,230,096 | B2 | 1/2016 | Sarin et al. |
| 9,596,268 | B2 | 3/2017 | Narayanaswamy et al. |

(Continued)

OTHER PUBLICATIONS

Sun et al., "A Provenance-Aware Access Control Framework with Typed Provenance," IEEE Transactions on Dependable and Secure Computing, vol. 13, No. 4, Jul.-Aug. 2016, 13 pages. https://profsandhu.com/journals/misc/tdsc-sun-etal-2016.pdf.

(Continued)

*Primary Examiner* — Joshua Bullock
(74) *Attorney, Agent, or Firm* — Yee & Associates, P.C.

(57) ABSTRACT

A method, apparatus, system, and computer program code for policy-based enforcement in a data virtualization system is provided. Responsive to receiving a query, a computer identifies a virtual object among a set of connected objects that is represented by a set of data assets and their hierarchical relationships. The virtual object corresponds to a subset of the data assets. The computer identifies a subset of objects according to a cumulative transitive closure of the virtual object over the set of connected objects. The computer identifies a set of policies for the subset of objects. For each object in the subset of objects, the computer determines an intermediate decision according to set of policies, whereby a set of intermediate decisions is formed. The computer deterministically reconciles the set of intermediate decisions to generate a resolved decision. The computer provides access to the queried virtual objects based on the resolved decision.

21 Claims, 8 Drawing Sheets

(56) References Cited

U.S. PATENT DOCUMENTS

| | | |
|---|---|---|
| 10,333,983 B2 | 6/2019 | Vaidya et al. |
| 10,409,793 B2* | 9/2019 | Smith ................... G06F 16/25 |
| 10,848,461 B2 | 11/2020 | Hira et al. |
| 2014/0025646 A1 | 1/2014 | Canales Valenzuela et al. |
| 2018/0012031 A1* | 1/2018 | Block ................. G06F 21/6218 |
| 2018/0276222 A1 | 9/2018 | Belknap et al. |
| 2021/0173952 A1* | 6/2021 | Raphael ............. G06F 21/6218 |
| 2022/0335156 A1* | 10/2022 | Raphael ................. G06F 16/25 |
| 2022/0346161 A1* | 10/2022 | Poscher ............. H04L 41/5025 |

OTHER PUBLICATIONS

"Welcome to the Denodo Platform 8.0 Documentation," copyright 2023, Denodo Technologies, accessed Mar. 1, 2023, 7 pages. https://community.denodo.com/docs/html/browse/8.0/en/.

"Centralize Security and Governance with Data Virtualization," copyright 2023, Denodo Technologies, accessed Mar. 1, 2023, 4 pages. https://www.denodo.com/en/webinar/centralize-security-and-governance-data-virtualization.

"Userand Access Rights in Virtual DataPort," copyright 2023, Denodo Technologies, accessed Mar. 1, 2023, 8 pages. https://community.denodo.com/docs/html/browse/latest/en/vdp/administration/databases_users_and_access_rights_in_virtual_dataport/user_and_access_right_in_virtual_dataport/user_and_access_right_in_virtual_dataport#row-restrictions.

Linthicum, "Next-Generation Data Virtualization: Fast and Direct Data Access, More Reuse, and Better Agility and Data Governance for BI, MDM, and SOA," May 24, 2011, copyright 2011, Netspective Communications LLC, 12 pages. https://www.informatica.com/downloads/1602_contextual_data_serv_wp.pdf.

\* cited by examiner

DETERMINISTIC ENFORCEMENT IN DATA VIRTUALIZATION SYSTEMS

BACKGROUND

1. Field

The disclosure relates generally to an improved computer system and, more specifically, to a method, apparatus, computer system, and computer program product for deterministic policy-based enforcement in data virtualization systems

2. Description of the Related Art

Data Virtualization (DV) is an example of an abstract data system. Data Virtualization allows users to create a virtual data lake by connecting to multiple data resources and accessing those resources through a single point of entry. This virtual data lake enables remote data access without any movement of the underlying data. A data governance catalog enables all data assets (source and abstract) to be cataloged and organized in a centralized inventory of available data, as well as governance of those assets according to data protection policies.

A data steward is usually an organization executive responsible for organization wide governance and utilization of data as an asset, via data processing, data analytics, data mining, data distribution, and the like. The data steward controls the access to organization's data by defining the data access compliance policies, such as General Data Protection Regulation policies, Data Loss Prevention policies, Data Protection policies, and the like, for enforcement by a computer system. The computer system captures these data access policies as executable rules. Before access to any data asset, the computer system checks the executable rules to determine a data access decision as to whether to allow access to a particular data asset, deny access to the data asset, or transform the data asset.

In Data Virtualization systems, access to data resources happens through virtual assets—abstracted objects that reference the source objects. A Data Virtualization system may define n layers of abstraction that sit on top of the source objects. Each of these layers can include one or more abstract (virtual) assets that access the data resource, a virtual representation of the data resource, or the abstract (virtual) assets of another abstraction layer. A query can occur against any layer of the abstraction, and any layer of abstraction can apply data access policies to data assets. Both abstract and source data assets can be managed, labeled, and governed in a centralized manner through a data governance catalog.

Traditionally, data virtualization systems enable governance of the data assets only at the abstract layer that is queried. However, the traditional model fails to account for policies defined on the source data assets or other layers of abstraction. Therefore, enforcing policies defined for intermediate abstract data layers and source (real) data assets becomes problematic for traditional data virtualization systems when attempting to access the data through an abstract data layer. For example, given an incoming DML query that can occur against the data assets at any layer of abstraction, traditional data virtualization systems are unable to determine and enforce a net outcome at the queried data layer in a manner that accounts for data protection policies of a source data asset, n levels of abstraction, and the corresponding abstract data asset.

SUMMARY

According to one illustrative embodiment, a computer-implemented method for policy-based enforcement in a data virtualization system is provided. Responsive to receiving a query, a computer identifies the queried virtual objects among a set of connected objects that represent hierarchical relationships within a set of data assets. A virtual object corresponds to a subset of the data assets. The computer identifies a subset of objects according to a cumulative transitive closure of the virtual object over the set of connected objects. The computer identifies a set of policies for the subset of objects. For each object in the subset of objects, the computer determines an intermediate decision according to set of policies, whereby a set of intermediate decisions is formed. The computer deterministically reconciles the set of intermediate decisions to generate a resolved decision. The computer applies the decision to the subset of the data assets based on the resolved decision.

According to other illustrative embodiments, a computer system and computer program product for policy-based enforcement in a data virtualization system are provided.

DETAILED DESCRIPTION

Figure 1:
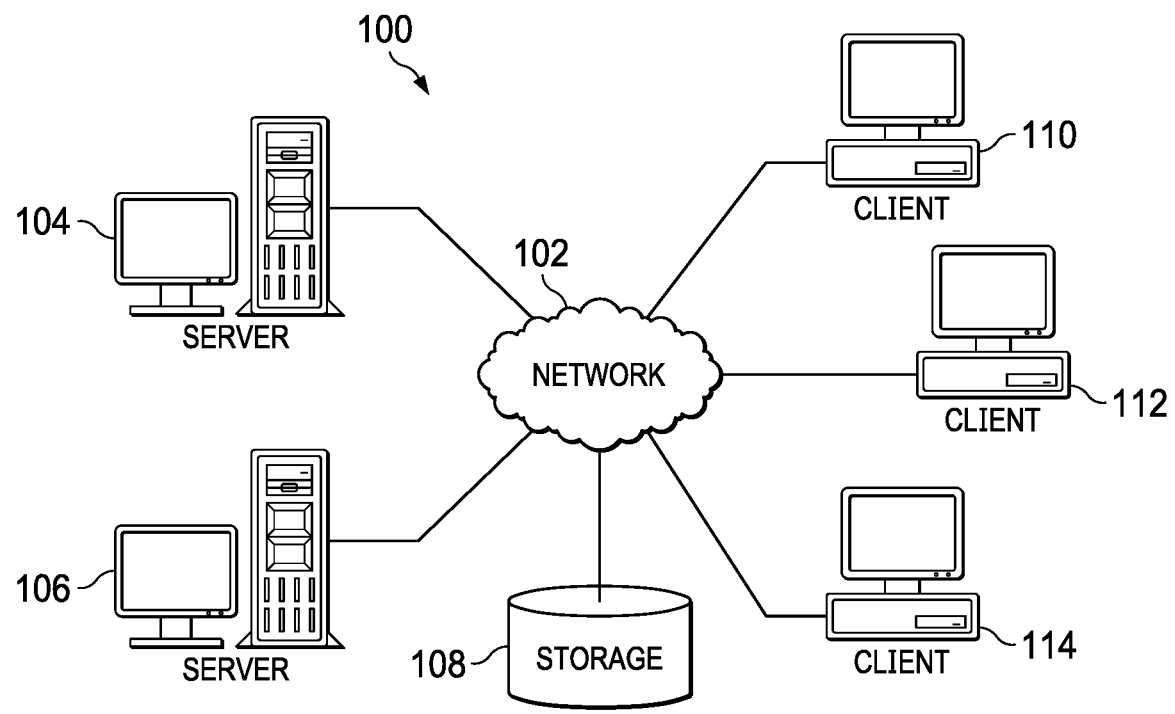
FIG. 1 depicts a pictorial representation of a network of data processing systems in which illustrative embodiments may be implemented.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 may provide data security services for data assets of one or more organizations. For example, server 104 and server 106 may serve data assets containing sensitive data to client devices based on security policies by applying space-time optimized inline transformations to the data assets prior to providing the data assets containing sensitive data to client devices. Also, it should be noted that server 104 and server 106 may each represent a cluster of servers in one or more data centers. Alternatively, server 104 and server 106 may each represent computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, kiosks, and the like, with wire or wireless communication links to network 102. Users of clients 110, 112, and 114 may utilize clients 110, 112, and 114 to send data asset access requests to server 104 and server 106.

Storage 108 is a network storage device capable of storing any type of data in a structured format or an unstructured format. In addition, storage 108 may represent a plurality of network storage devices. Further, storage 108 may store a plurality of different real data sets, virtual data sets, data provenance graphs, data assets, transformed data assets, identifiers for the plurality of transformed assets. Additionally, storage 108 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
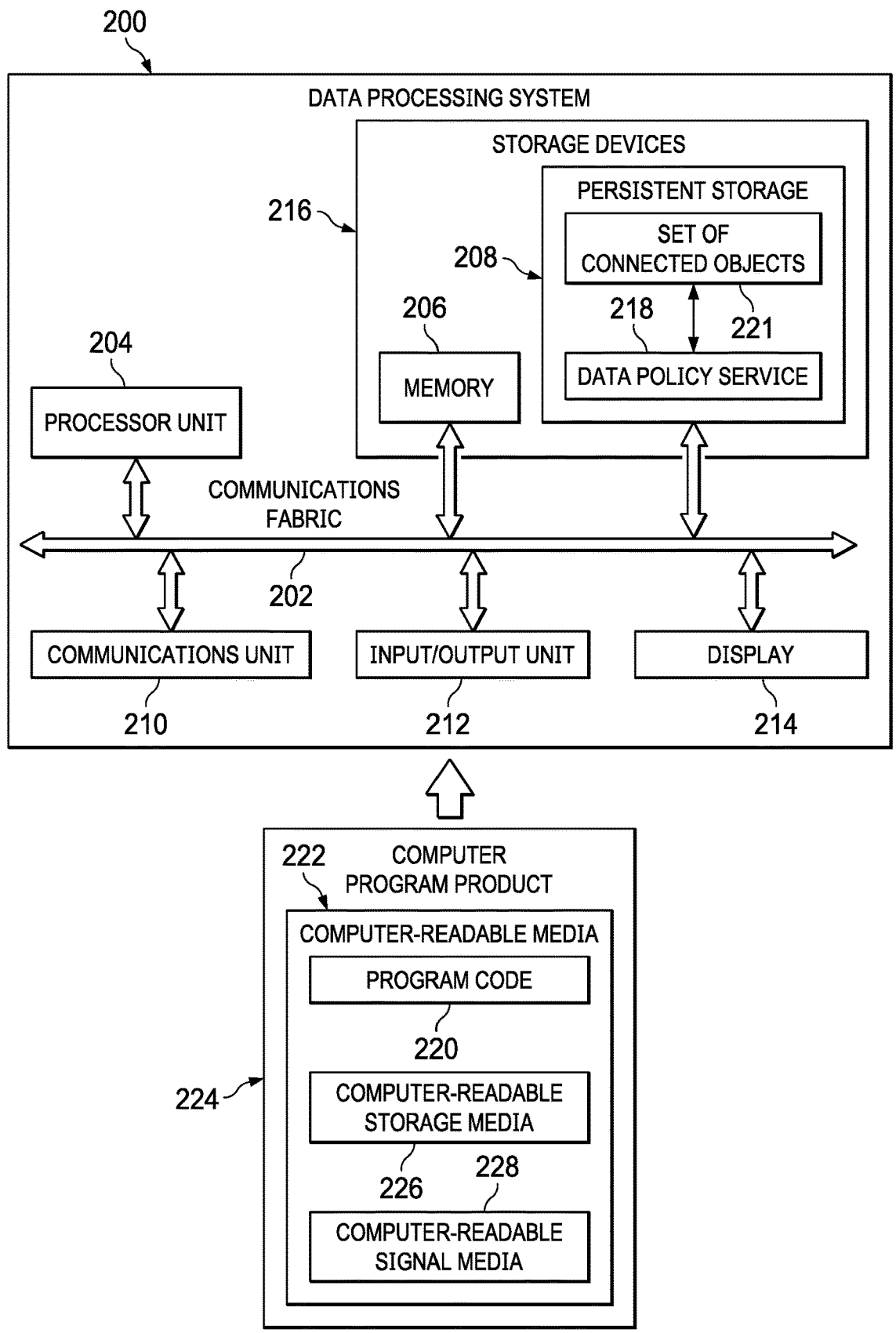
FIG. 2 is a diagram of a data processing system depicted in accordance with an illustrative embodiment.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores data policy service 218 and set of connected objects 221. However, it should be noted that even though data policy service 218 and set of connected objects 221 are illustrated as residing in persistent storage 208. In an alternative illustrative embodiment, data policy service 218 and set of connected objects 221 may be a separate component of data processing system 200. For example, data policy service 218 may be a hardware component coupled to communication fabric 202 or a combination of hardware and software components. In another alternative illustrative embodiment, a first set of components of data policy service 218 may be located in data processing system 200 and a second set of components of data policy service 218 may be located in a second data processing system, such as, for example, server 106 in FIG. 1.

Data policy service 218 utilizes set of connected objects 221 to account for the rules and policies defined on both source data assets and abstract data assets. Furthermore, Data policy service 218 utilizes set of connected objects 221 to enforce those rules and policies at the abstract level. Data policy service 218 maintains and leverage set of connected objects 221 for the purpose of policy enforcement; combining the rule/policy outcomes, as well as resolving conflicts and redundancies, on the data assets in the provenance chain rooted at the abstract data assets referenced by the query. In other words, set of connected objects 221 enables data policy service 218 to account for both the policies that apply to catalogued source data assets, and with abstract data assets, with n levels of abstraction in between. Set of connected objects 221 enables data policy service 218 to enforce those policies at any of the n levels of abstraction.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200. In some instances, computer readable storage media 226 may not be removable from data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 220 may be downloaded over a network to persistent storage 208 from another device or data processing system through computer readable signal media 228 for use within data processing system 200. For instance, program code stored in a computer readable storage media in a data processing system may be downloaded over a network from the data processing system to data processing system 200. The data processing system providing program code 220 may be a server computer, a client computer, or some other device capable of storing and transmitting program code 220.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 226 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
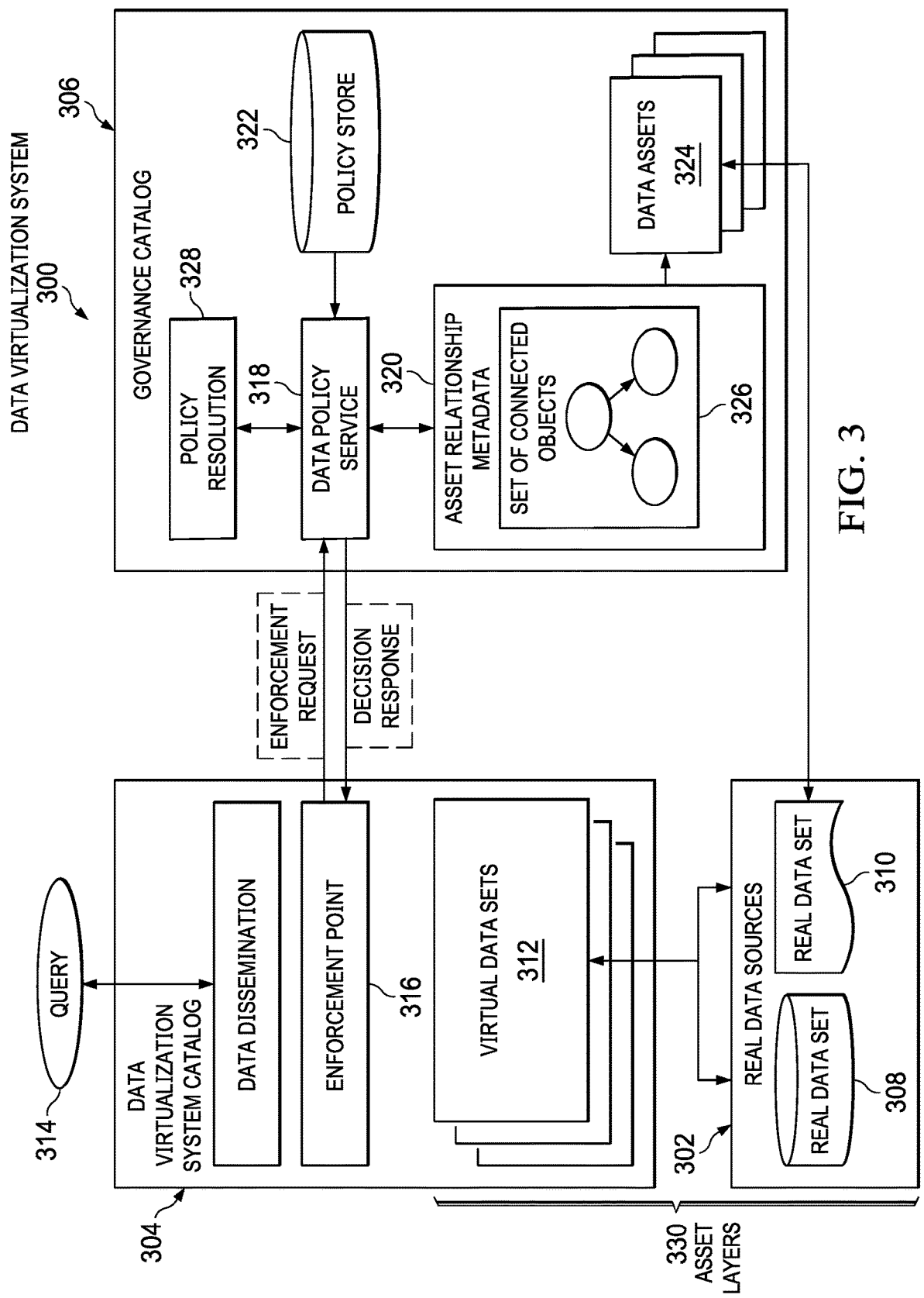
FIG. 3 is a diagram illustrating an example of a data virtualization system depicted in accordance with an illustrative embodiment.

With reference now to FIG. 3, a diagram illustrating an example of a data virtualization system is depicted in accordance with an illustrative embodiment. Data virtualization system 300 may be implemented in a network of data processing systems, such as, for example, network data processing system 100 in FIG. 1. Data virtualization system 300 is a system of hardware and software components for serving data assets, which contain sensitive data, based on security policies by applying space-time optimized inline transformations to the data sets to protect the sensitive data contained in the data sets.

In this example, data virtualization system 300 includes real data sources 302, data virtualization system catalog 304, and governance catalog 306. However, it should be noted that data virtualization system 300 is only meant as an example and not as a limitation on illustrative embodiments. In other words, data virtualization system 300 may include any number of data virtualization servers, client devices, asset stores, and other devices not shown. Real data sources 302 may be, for example, storage 108 in FIG. 1. Data virtualization system catalog 304 may be implemented in, for example, one or more of server 104 and server 104 in FIG. 1, as well as data processing system 200 in FIG. 2.

Real data sources 302 include one or more data sets, such as real data set 308 and real data set 310. Real data sources 302 is data at its origin. For example, real data set 308 and real data set 310 can be one or more real data objects, such as a database or a set of databases, a table or a set of tables, a set of data or sets of data, a document or a set of documents, a file or a set of files, and the like.

Data virtualization system catalog 304 includes one or more virtual data sets 312 that reference one or more of real data set 308 and real data set 310 residing in real data sources 302. In this context, data virtualization system catalog 304 is a metadata repository that stores and provides access to virtual data sets 312.

As used herein, virtual data sets 312, also sometimes referred to as "abstract data assets," are abstractions of one or more underlying data sets, such as one or more of real data set 308, real data set 310, and other virtual data sets 312. virtual data sets 312 may be organized into an unlimited number of abstraction levels. virtual data sets 312 can include, for example but not limited to, virtual database tables, grouped tables, database views, and references to data source objects in a federated environment.

Data virtualization system catalog 304 triggers enforcement requests messages on receipt of query 314 to a data policy service 318 which may reside inside governance catalog 306. Alternatively, data policy service may reside outside governance catalog 306.

Upon receiving query 314, enforcement point 316 parses a projection and predicate structure of the received SQL statement to identify one or more queried virtual data sets 312. Enforcement point 316 then passes this extracted information to data policy service 318 to generate a resolved decision based on data provenance information contained in asset relationship metadata 320 and one or more applicable policies in policy store 322.

Governance catalog 306, also sometimes referred to as an "asset catalog," is a system for collecting, organizing, and governing metadata about real and/or abstract data sets and their components. Governance catalog 306 includes a listing of data assets 324. Data assets 324 are metadata constructs that capture the attributes of the underlying data sets. Data assets 324 may represent real data sets 308, 310 or virtual data sets 312.

Data policy service 318 uses the various policies and rules in policy store 322 to control access to the virtual data sets 312. Policy store 322 is a collection of policies that guide data access enforcement decisions to achieve intended results. Policies may be, for example, one or more statements implemented as a procedure or protocol.

Each policy in policy store contains a set of one or more rules. Rules may be, for example, organization rules, government rules, data security regulations, and the like, that govern who can access what data, when, and from where. For example, one or more rules may represent a Boolean range of ALLOW and DENY as the as part of an enforcement decision, as well as possible discrete data transformations that could occur in between that range.

Asset relationship metadata 320 is a data structure that captures data provenance relationships between the data assets 324, and the data components of the data assets 324, at each of asset layers 330 from abstract all the way down to source. Asset relationship metadata 320 comprises set of connected objects 326, also sometimes referred to as a "data provenance graph." In one illustrative example, set of connected objects 326 is a directed acyclic graph that models data assets 324 as nodes and edges establishing relationship. For example, for a graph node representing a virtualized table, the adjacent upstream nodes will be the data assets of the source tables it is virtualized over.

The set of connected objects 326 may represent a set of data assets representing objects that may be located inside the data virtualization system, outside the data virtualization system, or a combination of both inside and outside the data virtualization system.

Edges between nodes represent data provenance relationships between data assets 324, and the data components of the data assets 324. For example, an edge connecting two nodes indicates a relationship between those data assets 324. For example, each column of a virtual table can be represented by a node in the graph. Edges connect columns of the virtual table to referenced columns in a source table. Edges may also capture a relationship type that applies to the projection. For example, edges may indicate whether a resulting column of a virtual table is a projection, sum, join, or group, of source columns.

Given a context, data policy service may evaluate a given data asset for rules/policies and to provide an outcome. For each queried data component of the set of connected objects 326, data policy service may provide policy evaluation outcome at each asset layer, from abstract all the way down to source.

For example, upon receiving context information from enforcement point 316, data policy service 318 generates an intermediate decision for each queried component based on data provenance information contained in set of connected objects 326 and one or more applicable policies. Each intermediate decision results from the application of policies at asset layers 330 corresponding to set of connected objects 326. At each asset layer, an intermediate decision may be to allow access to the requested data, deny access to the requested data, or transform the result set. Data policy service may capture the outcomes of the component evaluations in a graph, tree, matrix, or other data structure for the net policy resolution later.

The net policy resolution 328 aggregates the outcomes of the intermediate decisions, combining them into a resolved decision. Policies for both virtual objects and real objects are considered in the resolution of the resolved decision. In this manner, the illustrative embodiments invention allows accounting for the policies applying to the real objects, while accessing those real objects through a virtualization layer.

In one illustrative example, policy resolution 328 may define as hierarchy for policy actions (i.e., outcomes) according to their level of strictness, according to how much data is exposed. For example, denying access to an asset altogether is stricter than masking parts of it; redacting column values is more restrictive than substituting them. These are some examples of the methods that can be applied to the net policy resolution among many others, and should not be viewed as limiting The methods performed by policy resolution 328 may define what operation types shall maintain policy enforcement from one abstraction layer to another. For example, in a relational database, regular projections may need to inherit the policies from the source columns, while some aggregates (e.g., summation) of values in a view column shall be treated as an intrinsically new data, and therefore no policies shall apply purely based on the column provenance.

Different rules may apply to each of the components of both virtual data sets and real data sources. Policy resolution 328 accounts for the different rules at each of asset layers 330, deterministically reconciling intermediate decisions to generate a resolved decision that can be applied to determine data access.

In one illustrative embodiment, policy resolution 328 may define the hierarchy for policy actions (i.e., outcomes) according to their level of strictness, according to how much data is exposed. For example, policy resolution may apply a strictest of the outcomes in the intermediate decisions; For example, denying access to an asset altogether is stricter than masking parts of it; redacting column values is more restrictive than substituting them. For example, policy resolution may compound any transformation outcomes in a source-to-abstract sequence.

Data policy service sends resolved decision to enforcement point 316 for application at the abstraction layer of the queried virtual data sets 312. If the enforcement decision is to allow or deny access, then illustrative embodiments either allow access or deny access to the requested set of data based on the returned decision. When the enforcement decision is to transform, illustrative embodiments alter the SQL query based on the associated policy rules and user context so that the user can only access a portion of the requested data set and not the whole data set. Also, some data may be allowed only after data transformation, which includes masking, anonymization, hashing, and other obfuscation methods and transformations.

Because enforcement occurs in the abstraction layer, the policies affecting both virtual data sets 312 and real data sets 308, 310 are applied to the final result set. This enables users and applications to perform analytics and aggregations using the raw data and apply the policies to sensitive data at the time the result set is returned to the user/client.

Furthermore, the enforcement of the policies applying to the data assets 324 representing real data sets 308, 310 at the abstraction layer enables direct governance of real data sets 308, 310. For example, data stewards can leverage their pre-existing data governance work on the data assets representing real data sets 308, 310 when a data virtualization solution is later employed. Once employed, data virtualization system 300 accounts for the policies applicable to real data sets 308, 310 and enforces those policies without requiring the duplication of metadata to the data assets 324 representing virtual data sets 312.

Figure 4:
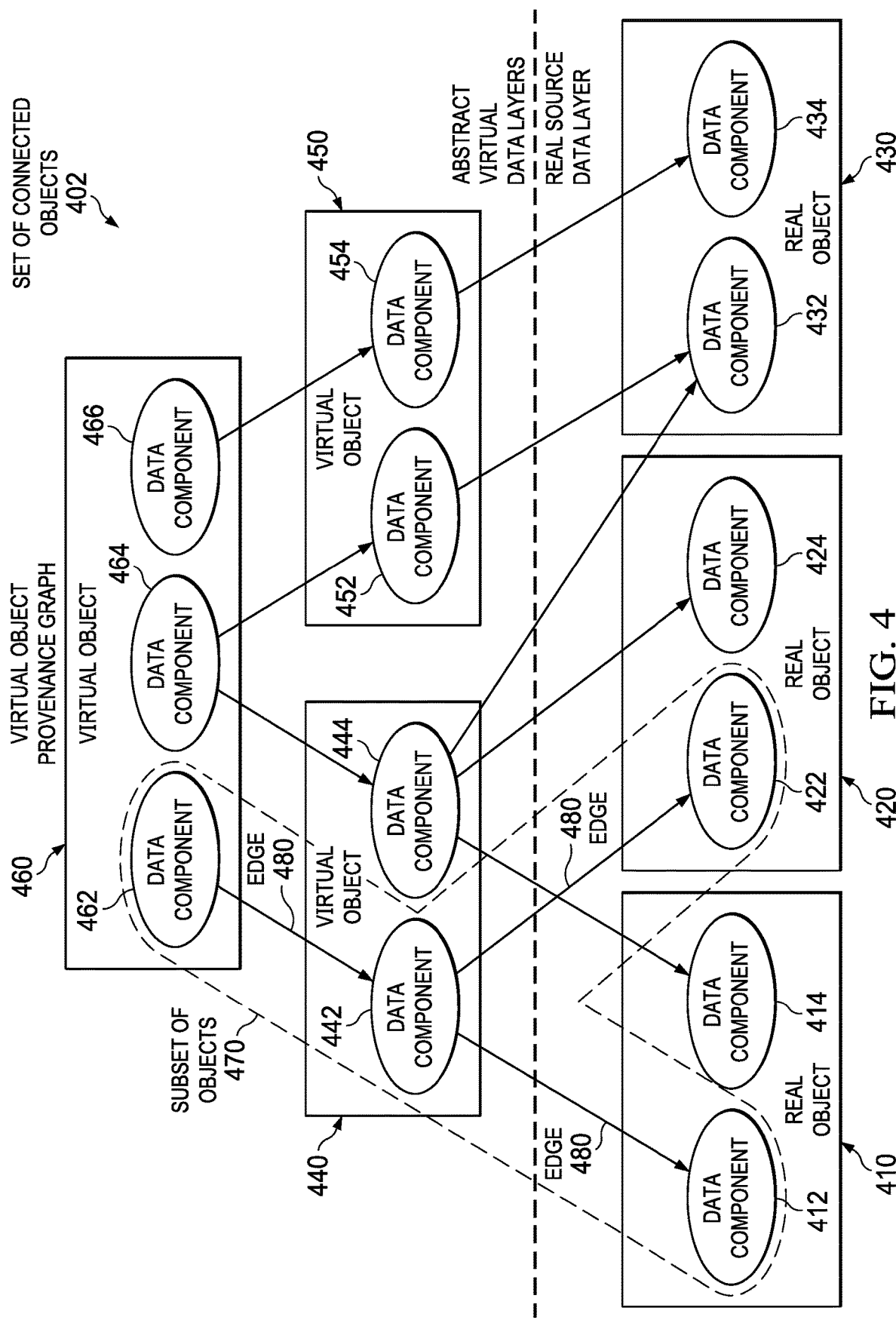
FIG. 4 is a diagram illustrating an example of a virtual object provenance graph depicted in accordance with an illustrative embodiment.

With reference now to FIG. 4, a diagram illustrating an example of a virtual object provenance graph is depicted in accordance with an illustrative embodiment. virtual object provenance graph 400 may be implemented in a computer, such as, for example, server 104 in FIG. 1, data processing system 200 in FIG. 2. Virtual object provenance graph 400 is one example of a set of connected objects that captures data provenance relationships between data assets, such as set of connected objects ABC of FIG. 2 and set of connected objects 326 of FIG. 3.

Virtual object provenance graph 400 represents data assets 324 as a set of connected objects 402, including both real objects 410, 420, 430, and virtual objects 440, 450, 460. Virtual object provenance graph 400 captures the relationships between the data assets as well as their components from abstract all the way down to source.

Virtual object provenance graph 400 maintains relationships between the data components of data assets. Each data component of a virtual object ultimately traces to a data component of a real object, according to a defined relationship. The relationship type that applies to the projection is to be captured in the form of edges 480 that connect the data components. For example, as depicted, data component 462 maps to data component 442, which in turn maps to data components 412, 422. Data component 464 maps to data components 444 and 452, which in turn map to data components 414, 424, 432, and data component 432, respectively. Data component 466 maps to data component 454, which in turn maps to data component 434.

When a data asset is accessed, for example in a query, referenced data assets, as well as their referenced data components, are identified. Reference assets and their components are identified, for example using qualified identifiers, over the set of connected objects according to a cumulative transitive closure rooted at a queried virtual object. For example, a query of virtual object 460 may reference data component 462. Virtual object 460 is projected down to real objects 410, 420, identifying subset of objects 470, rooted at virtual object 460, that includes data components 412, 422, 442, and 462.

Figure 5:
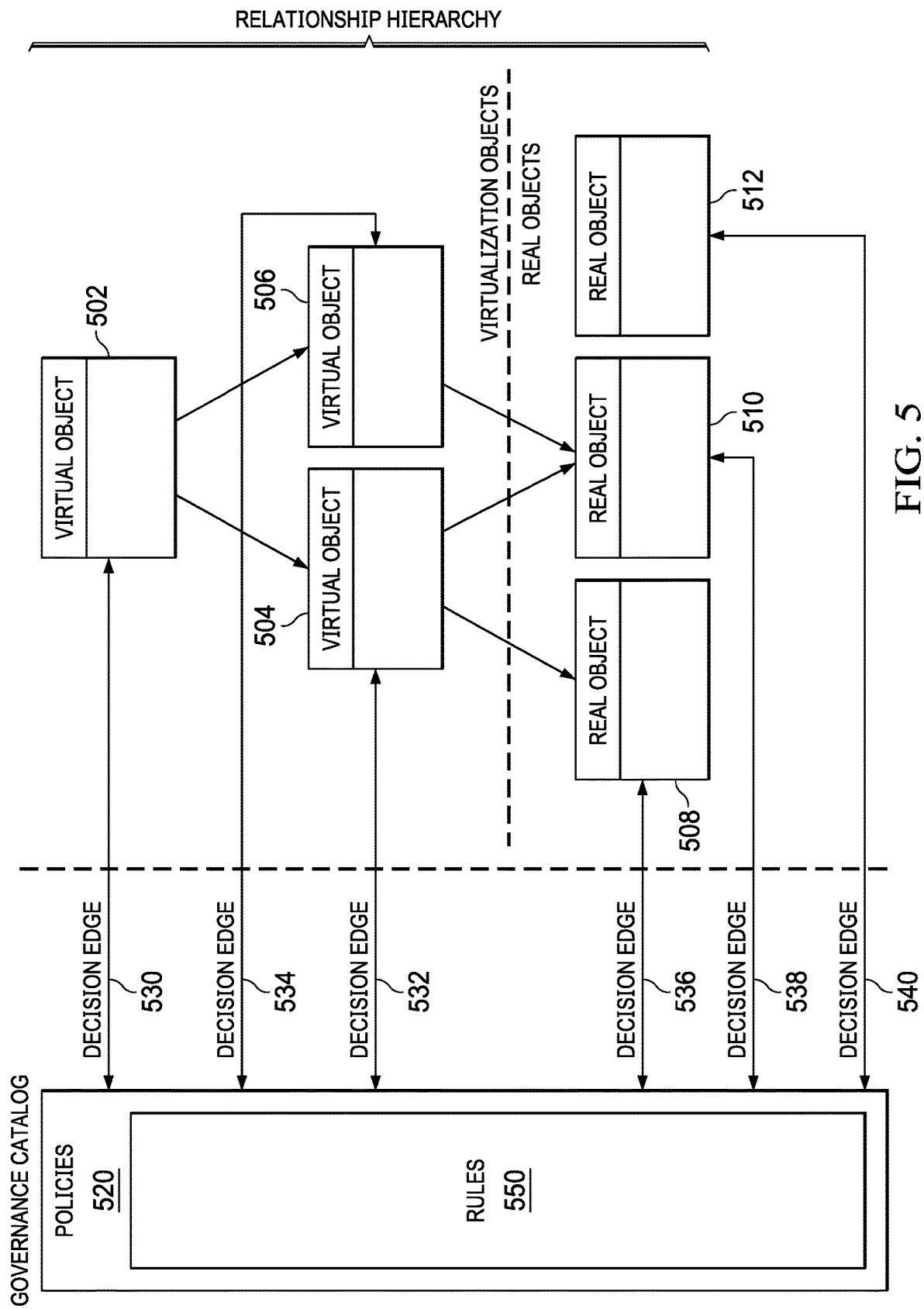
FIG. 5, a diagram illustrating an example of policy evaluation in a data virtualization system is depicted in accordance with an illustrative embodiment.

With reference now to FIG. 5, a diagram illustrating an example of policy evaluation in a data virtualization system is depicted in accordance with an illustrative embodiment. virtual object provenance graph 400 may be implemented in a computer, such as, for example, server 104 in FIG. 1, data processing system 200 in FIG. 2. Virtual object provenance graph 400 is one example of a set of connected objects that captures data provenance relationships between data assets, such as set of connected objects 221 of FIG. 2 and set of connected objects 326 of FIG. 3.

When a user queries a virtual data set, corresponding virtual objects are located in the provenance graph. For example, as depicted, virtual object 502 corresponds to a queried asset. Virtual objects 504, 506, and real objects 508, 510 are identified according to a cumulative transitive closure rooted at a virtual object 502, forming a subset of the connected objects; a sub-tree in virtual object provenance graph 400, spanning from virtual object 502, all the way down to real objects 508, 510.

Each component of the objects in the sub-tree chain are evaluated against the policies 520. Traversal of the spanning sub-tree (sub-graph) within the graph accounts for the relationship between nodes and terminates when a corresponding operation edge is encountered. For each queried virtual object at an asset level, a projections list is built as the virtual object provenance graph 400 is traversed, based on what is requested in DML. Full projections of the composite assets are determined, down to the source/real asset components (e.g., columns). and outcomes or determined for each contributing component of the objects.

The contributing asset evaluation outcomes can be captured in a graph, tree, matrix, or other data structure for the later net decision resolution. For example, in a matrix view of outcomes, columns may indicate queried abstract objects, with rows indicating contributing objects in the provenance chain.

Different ones of rules 550 may apply to each of the components of the different objects in virtual object provenance graph 400. Decision edges 530, 532, 534, 536, 538, and 540 may connect to each of the components in virtual objects 502, 504, 506, and real objects 508, 510, according to the associated rules 550. Each queried asset component (e.g., column) in the root of the sub-tree, i.e., virtual object 502, is evaluated against defined rules 550 of policies 520 to obtain the outcome for each node in the tree (sub-graph) as their sub-trees are traversed. the outcomes of the component evaluations, for example, an outcome on the allow-transform-deny range, are captured for the net decision resolution.

For example, in a matrix view of contributing column evaluation outcomes, columns may indicate the asset in the root node, with rows indicating contributing columns to the query result set for the asset in the root node. A depth level of the contributing columns can be indicated by a function [L{n}]. The depth levels can be used to order the evaluation outcomes according to the levels of abstraction.

For example, a matrix-based for view of contributing column evaluation outcomes for subset of objects 470 of FIG. 4 is shown in Table 1.

TABLE 1

|  | data component 462 |
|---|---|
| virtual object 460.data component 462 | [outcome] |
| virtual object 440.data component 442 | [outcome] |
| real object 410.data component 412 | [outcome] |
| real object 420.data component 422 | [outcome] |

When the outcomes are known for all nodes in the graph rooted at the assets requested in DML, the source data protection rules are accounted for in policy evaluation. The outcomes in the chain are aggregated based on the preferred method, including any conflict resolution and transformation optimizations for non-binary decisions in a source-to-abstract sequence. The outcomes are combined into a resolved decision that can be applied to the root component.

Figure 6:
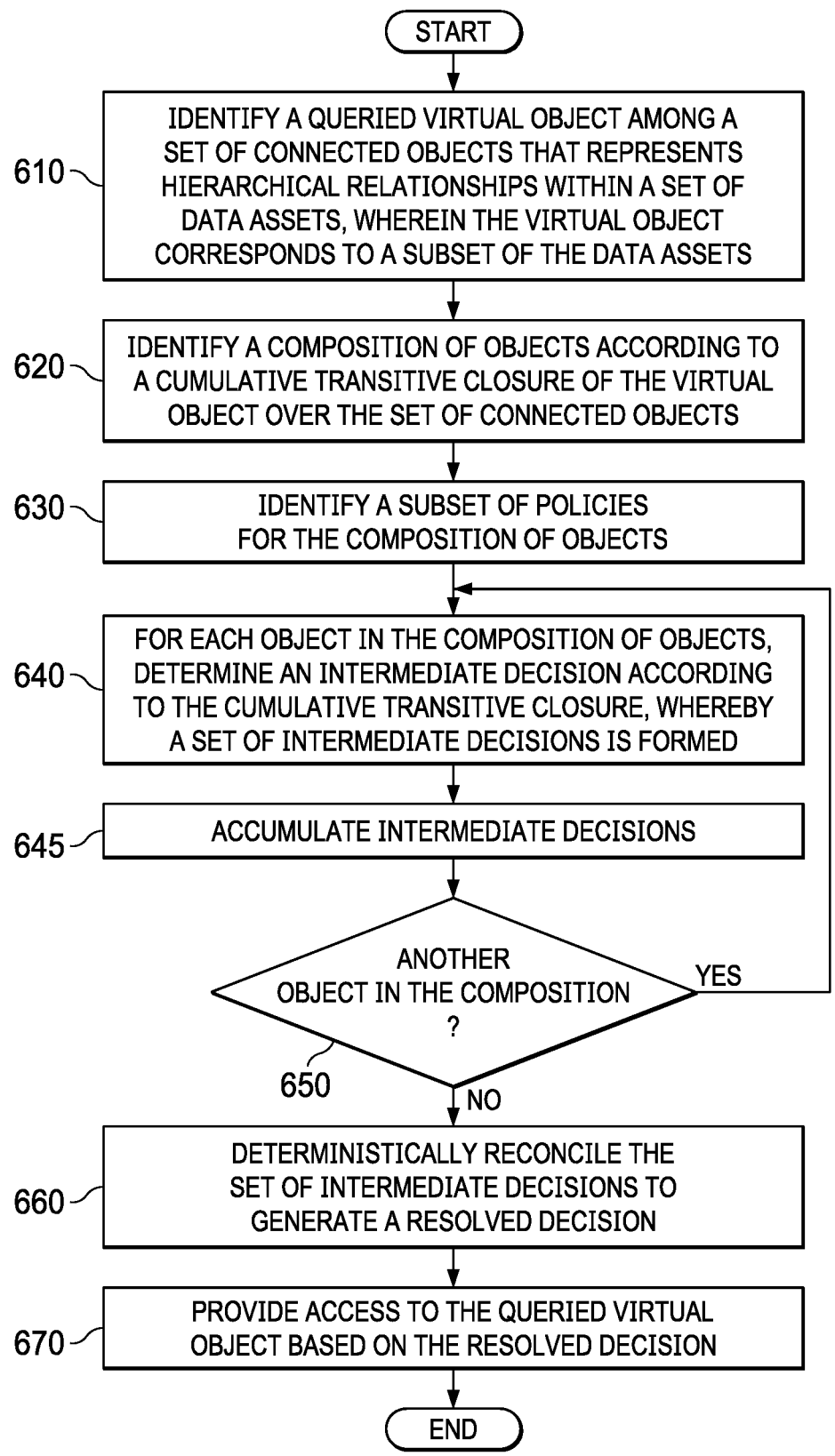
FIG. 6 is a flowchart illustrating a process for policy-based enforcement in a data virtualization system shown in accordance with an illustrative embodiment.

With reference now to FIG. 6, a flowchart illustrating a process for policy-based enforcement in a data virtualization system is shown in accordance with an illustrative embodiment. The process shown in FIG. 6 may be implemented in a computer, such as, for example, server 104 in FIG. 1, data processing system 200 in FIG. 2, or data virtualization system 300 in FIG. 3.

Responsive to receiving a query, a computer system identifies a queried virtual object among a set of connected objects that represents a set of data assets and their hierarchical relationships. The queried virtual object corresponds to a subset of the data assets (step 610). The set of connected objects may comprise a directed acyclic graph that captures data provenance relationships between the data assets as well as components of the data assets at each asset layer.

In an illustrative example, a query may reference one or more objects among the set of connected objects. In this example, the computer system may identify a single object, or a plurality of objects referenced by the query. In doing so, the computer system identifies "a queried virtual object," which may be the singular object, or one of the plurality of objects. Subsequent steps of the method of FIG. 6 can be performed for the singular object, or each of the plurality of objects referenced by the query.

The computer system identifies a subset of objects according to a cumulative transitive closure rooted at the queried virtual object over the set of connected objects (step 620) and identifying a set of policies for the subset of objects (step 630).

For each object in the subset of objects, the computer system applies the set of policies to determine an intermediate decision according to the cumulative transitive closure (step 640). The process accumulates the intermediate decisions (step 645). Collectively, the intermediate decisions form a set of intermediate decisions.

If there are other objects in the subset ("yes" at step 650), the process iterates back to step 640. Otherwise ("no" at step 650), the process continues to step 660.

The computer system deterministically reconciles the set of intermediate decisions to generate a resolved decision (step 660). Based on the resolved decision, the computer system provides access to the subset of data assets (step 670), With the process terminating thereafter.

Figure 7:
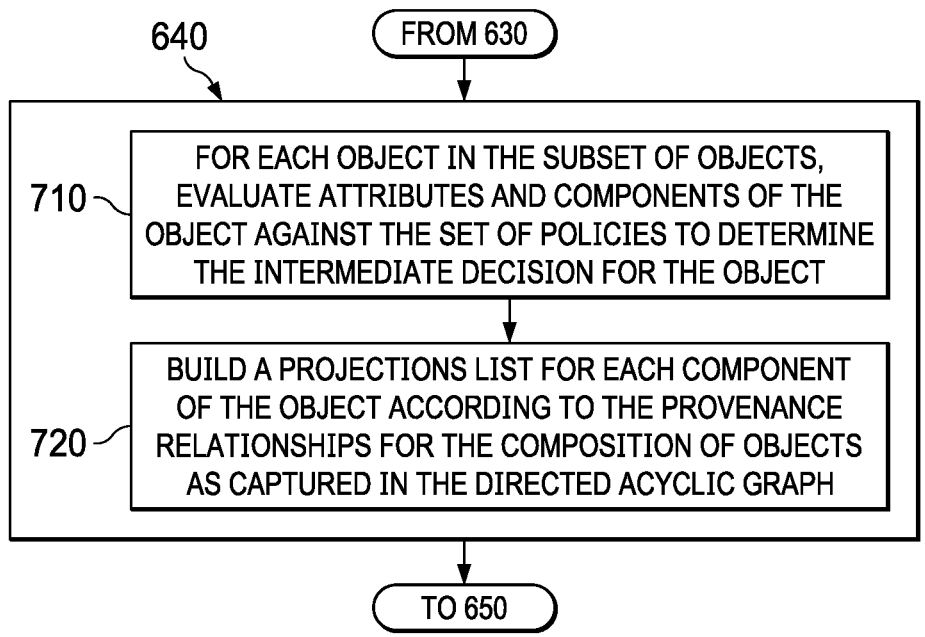
FIG. 7 is a flowchart illustrating a process for determining the intermediate decision for the object shown in accordance with an illustrative embodiment.

With reference now to FIG. 7, a flowchart illustrating a process for determining the intermediate decision for the object is shown in accordance with an illustrative embodiment. The process shown in FIG. 7 may be implemented in a computer, such as, for example, server 104 in FIG. 1, data processing system 200 in FIG. 2, or data virtualization system 300 in FIG. 3.

Continuing from step 630, for each object in the subset of objects, the computer system evaluates attributes and components of the object against the set of policies to determine the intermediate decision for the object (step 710). An intermediate decision can be determined for the object itself, as well as for each participating component of the object.

In one illustrative example, the process may include building a projections list for each component of the object according to the provenance relationships for the subset of objects as captured in the directed acyclic graph (step 720). Thereafter, the process continues to step 650 of FIG. 6.

Figure 8:
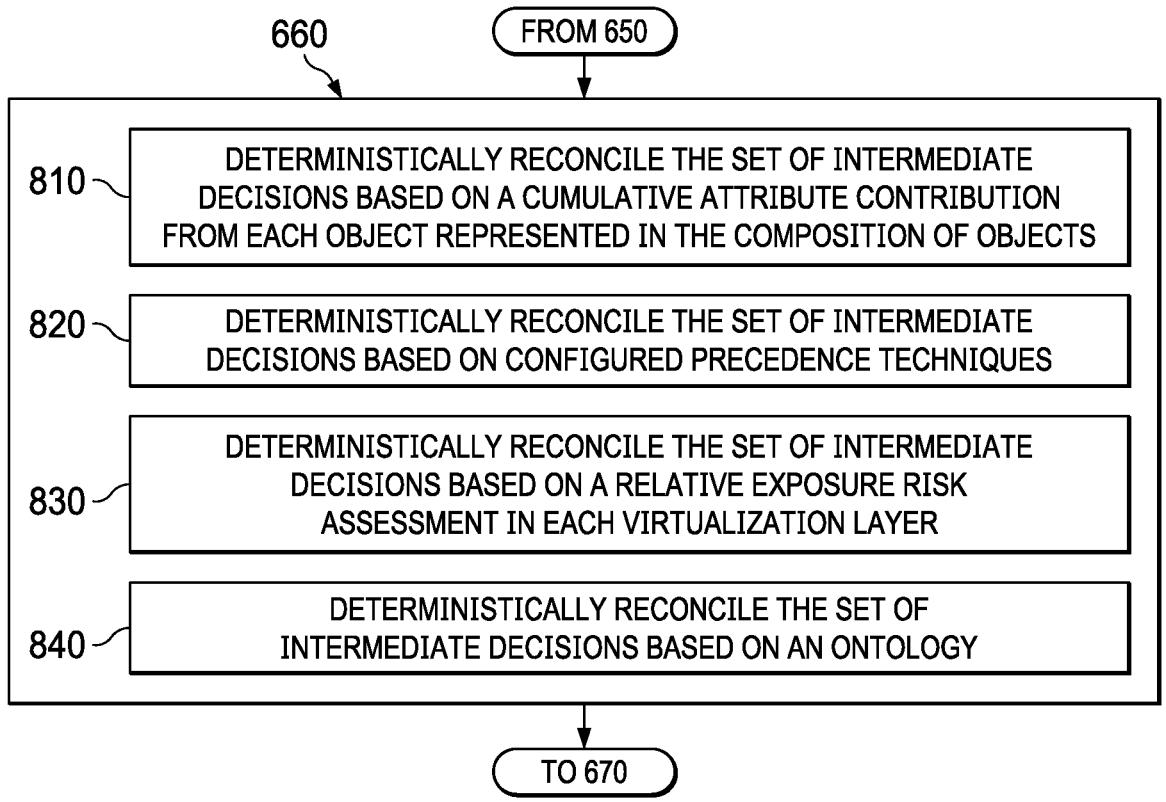
FIG. 8 is a flowchart illustrating a process for deterministically reconciling the set of intermediate decisions shown in accordance with an illustrative embodiment.

With reference now to FIG. 8, a flowchart illustrating a process for deterministically reconciling the set of intermediate decisions is shown in accordance with an illustrative embodiment. The process shown in FIG. 8 may be implemented in a computer, such as, for example, server 104 in FIG. 1, data processing system 200 in FIG. 2, or data virtualization system 300 in FIG. 3.

Continuing from step 650, in one illustrative example, from each object represented in the subset of objects (step 810). In one illustrative example, deterministically reconciling the set of intermediate decisions may be based on configured precedence techniques (step 820). In one illustrative example, deterministically reconciling the set of intermediate decisions may be based on a relative exposure risk assessment in each virtualization layer (step 830). In one illustrative example, deterministically reconciling the set of intermediate decisions may be based on an ontology knowledge (step 840). Thereafter, the process continues to step 670 of FIG. 6.

Figure 9:
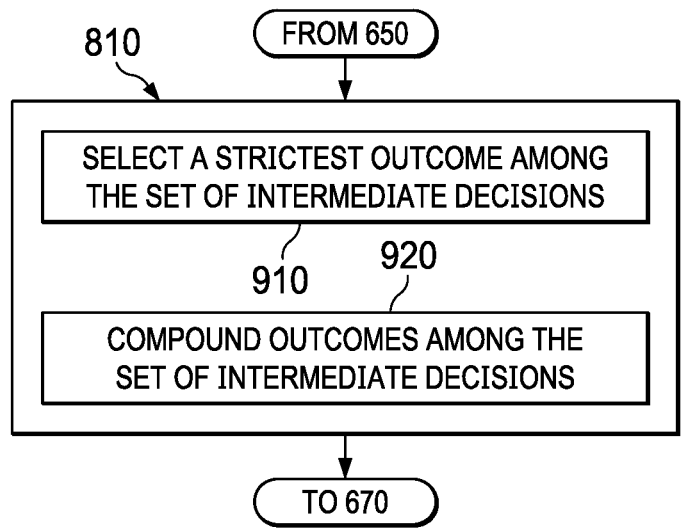
FIG. 9 is a flowchart illustrating a process for deterministically reconciling the set of intermediate decisions shown in accordance with an illustrative embodiment.

With reference now to FIG. 9, a flowchart illustrating a process for deterministically reconciling the set of intermediate decisions is shown in accordance with an illustrative embodiment. The process shown in FIG. 9 may be implemented in a computer, such as, for example, server 104 in FIG. 1, data processing system 200 in FIG. 2, or data virtualization system 300 in FIG. 3.

In one illustrative example, deterministically reconciling the set of intermediate decisions may be based on a cumulative attribute contribution may include selecting a strictest outcome among the set of intermediate decisions (step 910). In another illustrative example, deterministically reconciling the set of intermediate decisions may be based on a cumulative attribute contribution may include compounding outcomes among the set of intermediate decisions (step 920). Thereafter, the process continues to step 670 of FIG. 6

For example, as the nodes are evaluated against the policies, if the root outcome evaluates to a denial of access, a "DENY" outcome may be deterministically reconciled as the resolved decision. Furthermore, if all adjacent nodes evaluate to a denial of access, a "DENY" outcome may be deterministically reconciled as the resolved decision.

If the queried asset(s) did not evaluate to "DENY", illustrated embodiments may perform transformation optimizations for each column at the root projection: either picking a most stringent transformation in the provenance tree of the column, or compounding the transformations.

In one illustrative example, if an intermediate composite asset evaluates to "DENY, obfuscation may be applied to the contributing columns where the intermediate composite asset only contributes a subset of projection to the root of the spanning sub-tree. If an asset participates in a JOIN, all columns participating in the JOIN may be obfuscated to maintain referential integrity. Alternatively, a "DENY" outcome may be returned at the root of the component.

In one illustrative example, if an aggregation is encountered in the spanning sub-tree, a "DENY" outcome may be returned at the root of the component. If a user-defined function is encountered in the spanning sub-tree, a "DENY" outcome may be returned at the root of the component.

Figure 10:
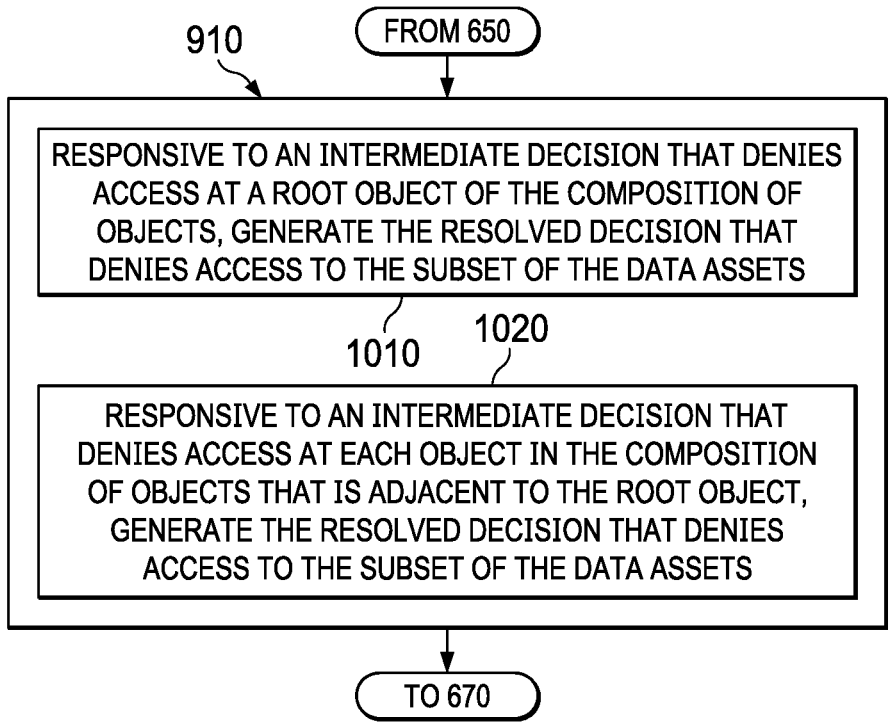
FIG. 10 is a flowchart illustrating a process for compounding outcomes among the set of intermediate decisions shown in accordance with an illustrative embodiment.

With reference now to FIG. 10, a flowchart illustrating a process for compounding outcomes among the set of intermediate decisions is shown in accordance with an illustrative embodiment. The process shown in FIG. 10 may be implemented in a computer, such as, for example, server 104 in FIG. 1, data processing system 200 in FIG. 2, or data virtualization system 300 in FIG. 3.

Continuing from step 650, in one illustrative example, deterministically reconciling the set of intermediate decisions may include generating the resolved decision that denies access to the queried virtual object (step 1010). The resolved decision may be generated in response to an intermediate decision that denies access at a root object of the subset of objects. For example, as the nodes are evaluated against the policies, if the root outcome evaluates to a denial of access, a "DENY" outcome may be deterministically reconciled as the resolved decision.

In one illustrative example, deterministically reconciling the set of intermediate decisions may include generating the resolved decision that denies access to the queried virtual object (step 1020). The resolved decision may be generated in response to an intermediate decision that denies access at each object in the subset of objects that is adjacent to the root object. For example, if all adjacent nodes evaluate to a denial of access, a "DENY" outcome may be deterministically reconciled as the resolved decision.

Thus, illustrative embodiments of the present invention provide a computer-implemented method, computer system, and computer program product for policy-based enforcement in a data virtualization system. The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for policy-based enforcement in a data virtualization system, comprising:
responsive to receiving a query, identifying a queried virtual object among a set of connected objects that is represented by a set of data assets and their hierarchical relationships, wherein the queried virtual object corresponds to a subset of the data assets;
identifying a subset of objects according to a cumulative transitive closure rooted at the queried virtual object over the set of connected objects;
identifying a set of policies applying to the subset of objects;
for each object in the subset of objects, applying the set of policies to determine an intermediate decision according to the cumulative transitive closure, whereby a set of intermediate decisions is formed;
deterministically reconciling the set of intermediate decisions to generate a resolved decision; and
providing access to the subset of the data assets based on the resolved decision.

2. The method of claim 1, wherein the set of connected objects comprises a directed acyclic graph that captures data provenance relationships between the data assets representing data sets local and external to the data virtualization system as well as components of the data assets at each asset layer.

3. The method of claim 2, wherein determining the intermediate decision for the object further comprises:
for each object in the subset of objects, evaluating attributes and components of the object against the set of policies to determine the intermediate decision for the object.

4. The method of claim 3, wherein evaluating the components of the object further comprises:
building a projections list for each component of the object according to the provenance relationships for the subset of objects as captured in the directed acyclic graph.

5. The method of claim 3, wherein deterministically reconciling the set of intermediate decisions further comprises one or more of:
deterministically reconciling the set of intermediate decisions based on a cumulative attribute contribution from each object represented in the subset of objects;
deterministically reconciling the set of intermediate decisions based on configured precedence techniques;
deterministically reconciling the set of intermediate decisions based on a relative exposure risk assessment in each virtualization layer; and
deterministically reconciling the set of intermediate decisions based on an ontology.

6. The method of claim 3, wherein deterministically reconciling the set of intermediate decisions further comprises one or more of:
selecting a strictest outcome among the set of intermediate decisions; and
compounding outcomes among the set of intermediate decisions.

7. The method of claim 6, wherein compounding outcomes among the set of intermediate decisions further comprises one or more of:
responsive to an intermediate decision that denies access at a root object of the subset of objects, generating the resolved decision that denies access to the queried virtual object; and
responsive to an intermediate decision that denies access at each object in the subset of objects that is adjacent to the root object, generating the resolved decision that denies access to the queried virtual object.

8. A computer system comprising:
a hardware processor; and a data policy service, in communication with the hardware processor, wherein the data policy service is configured:
  responsive to receiving a query, identifying a queried virtual object among a set of connected objects that represents a set of data assets and their hierarchical relationships, wherein the queried virtual object corresponds to a subset of the data assets;
  identifying a subset of objects according to a cumulative transitive closure rooted at the queried virtual object over the set of connected objects;
  identifying a set of policies for the subset of objects;
  for each object in the subset of objects, applying the set of policies to determine an intermediate decision according to the cumulative transitive closure, whereby a set of intermediate decisions is formed;
  deterministically reconciling the set of intermediate decisions to generate a resolved decision; and
  providing access to the queried virtual object based on the resolved decision.

9. The computer system of claim 8, wherein the set of connected objects comprises a directed acyclic graph that captures data provenance relationships between the data assets as well as components of the data assets at each asset layer.

10. The computer system of claim 9, wherein in determining the intermediate decision for the object, the data policy service is further configured:
  for each object in the subset of objects, evaluating attributes and components of the object against the set of policies to determine the intermediate decision for the object.

11. The computer system of claim 10, wherein in evaluating the components of the object, the data policy service is further configured:
  building a projections list for each component of the object according to the provenance relationships for the subset of objects as captured in the directed acyclic graph.

12. The computer system of claim 10, wherein in deterministically reconciling the set of intermediate decisions, the data policy service is further configured to perform one or more of:
  deterministically reconciling the set of intermediate decisions based on a cumulative attribute contribution from each object represented in the subset of objects;
  deterministically reconciling the set of intermediate decisions based on configured precedence techniques;
  deterministically reconciling the set of intermediate decisions based on a relative exposure risk assessment in each virtualization layer; and
  deterministically reconciling the set of intermediate decisions based on an ontology.

13. The computer system of claim 10, wherein in deterministically reconciling the set of intermediate decisions, the data policy service is further configured to perform one or more of:
  selecting a strictest outcome among the set of intermediate decisions; and
  compounding outcomes among the set of intermediate decisions.

14. The computer system of claim 13, wherein in compounding outcomes among the set of intermediate decisions, the data policy service is further configured to perform one or more of:
  responsive to an intermediate decision that denies access at a root object of the subset of objects, generating the resolved decision that denies access to the queried virtual object; and
  responsive to an intermediate decision that denies access at each object in the subset of objects that is adjacent to the root object, generating the resolved decision that denies access to the queried virtual object.

15. A computer program product comprising:
  a computer readable storage media; and
  program code, stored on the computer readable storage media, for policy-based enforcement in a data virtualization system, the program code comprising:
    program code for identifying, responsive to receiving a query, a queried virtual object among a set of connected objects that represents a set of data assets and their hierarchical relationships, wherein the queried virtual object corresponds to a subset of the data assets;
    identifying a subset of objects according to a cumulative transitive closure rooted at the queried virtual object over the set of connected objects;
    program code for identifying a set of policies for the subset of objects;
    program code for applying, for each object in the subset of objects, the set of policies to determine an intermediate decision according to the cumulative transitive closure, whereby a set of intermediate decisions is formed;
    program code for deterministically reconciling the set of intermediate decisions to generate a resolved decision; and
    program code for providing access to the queried virtual object based on the resolved decision.

16. The computer program product of claim 15, wherein the set of connected objects comprises a directed acyclic graph that captures data provenance relationships between the data assets as well as components of the data assets at each asset layer.

17. The computer program product of claim 16, wherein determining the intermediate decision for the object further comprises:
  program code for evaluating, for each object in the subset of objects, attributes, and components of the object against the set of policies to determine the intermediate decision for the object.

18. The computer program product of claim 17, wherein evaluating the components of the object further comprises:
  program code for building a projections list for each component of the object according to the provenance relationships for the subset of objects as captured in the directed acyclic graph.

19. The computer program product of claim 17, wherein deterministically reconciling the set of intermediate decisions further comprises one or more of:
  program code for deterministically reconciling the set of intermediate decisions based on a cumulative attribute contribution from each object represented in the subset of objects;
  program code for deterministically reconciling the set of intermediate decisions based on configured precedence techniques;
  program code for deterministically reconciling the set of intermediate decisions based on a relative exposure risk assessment in each virtualization layer; and
  program code for deterministically reconciling the set of intermediate decisions based on an ontology.

20. The computer program product of claim 17, wherein deterministically reconciling the set of intermediate decisions further comprises one or more of:
   program code for selecting a strictest outcome among the set of intermediate decisions; and
   program code for compounding outcomes among the set of intermediate decisions.

21. The computer program product of claim 20, wherein compounding outcomes among the set of intermediate decisions further comprises one or more of:
   program code for generating the resolved decision that denies access to the queried virtual object in response to an intermediate decision that denies access at a root object of the subset of objects; and
   program code for generating the resolved decision that denies access to the queried virtual object in response to an intermediate decision that denies access at each object in the subset of objects that is adjacent to the root object.

* * * * *